(12) United States Patent
Kim (10) Patent No.: US 7,697,084 B2
(45) Date of Patent: Apr. 13, 2010

(54) HOUSING FOR LIQUID CRYSTAL DISPLAY DEVICE HAVING A MAIN SUPPORTER AND TWO BOTTOM COVERS

(75) Inventor: Yong Sang Kim, Gyeongsangbuk-do (KR)

(73) Assignee: LG Display Co., Ltd., Seoul (KR)

( * ) Notice: Subject to any disclaimer, the term of this patent is extended or adjusted under 35 U.S.C. 154(b) by 192 days.

(21) Appl. No.: 11/304,533

(22) Filed: Dec. 16, 2005

(65) Prior Publication Data

US 2006/0285030 A1    Dec. 21, 2006

(30) Foreign Application Priority Data

Jun. 20, 2005    (KR) .............................. 2005-053125

(51) Int. Cl.
 *G02F 1/1335* (2006.01)
(52) U.S. Cl. .............................. 349/58; 349/59; 349/60
(58) Field of Classification Search ................... 349/58, 349/59–71
See application file for complete search history.

(56) References Cited

U.S. PATENT DOCUMENTS

| 6,392,723 | B1 * | 5/2002 | Sugiyama et al. | 349/58 |
| 6,919,941 | B2 * | 7/2005 | Huang et al. | 349/58 |
| 2004/0041961 | A1 * | 3/2004 | Lee | 349/58 |
| 2004/0212756 | A1 * | 10/2004 | Fukayama et al. | 349/58 |

FOREIGN PATENT DOCUMENTS

| CN | 1121647 C | 1/2001 |
| JP | 2004-214094 | 7/2004 |

* cited by examiner

*Primary Examiner*—David Nelms
*Assistant Examiner*—Lauren Nguyen
(74) *Attorney, Agent, or Firm*—Morgan Lewis & Bockius LLP

(57) ABSTRACT

The liquid crystal display (LCD) device includes a main supporter in which a backlight and an LCD panel are mounted, and two bottom covers that are engaged with the main supporter to protect the backlight and the LCD panel, wherein the bottom covers are symmetrical to each other to be located at both sides of a long direction of the main supporter.

3 Claims, 9 Drawing Sheets

HOUSING FOR LIQUID CRYSTAL DISPLAY DEVICE HAVING A MAIN SUPPORTER AND TWO BOTTOM COVERS

This application claims the benefit of the Korean Patent Application No. P2005-053125 filed in Korea on Jun. 20, 2005, which is hereby incorporated by reference.

BACKGROUND OF THE INVENTION

1. Field of the Invention

The present invention relates to a liquid crystal display (LCD) device, and more particularly, to a backlight unit for the LCD.

2. Description of the Related Art

Recently, much effort has been made to study and develop various types of flat panel display, such as a liquid crystal display (LCD) device, a field emission display (FED) device, an electro-luminescence display (ELD) device, a plasma display panel (PDP), etc. Among these flat panel display devices, the LCD device has attracted considerable attention because of its high resolution, light weight, thin profile, compact size and low power consumption.

The LCD controls a light transmittance of a liquid crystal material to thereby display a picture. To this end, the LCD includes an LCD module having an LCD panel, a driving circuitry for driving the LCD module, and a case. The LCD panel has liquid crystal cells arranged in a matrix form between two glass substrates, a backlight unit for irradiating light onto the LCD panel, and a casing. Hereinafter, a related art LCD device will be described with reference to the accompanying drawings as follows.

Figure 1:
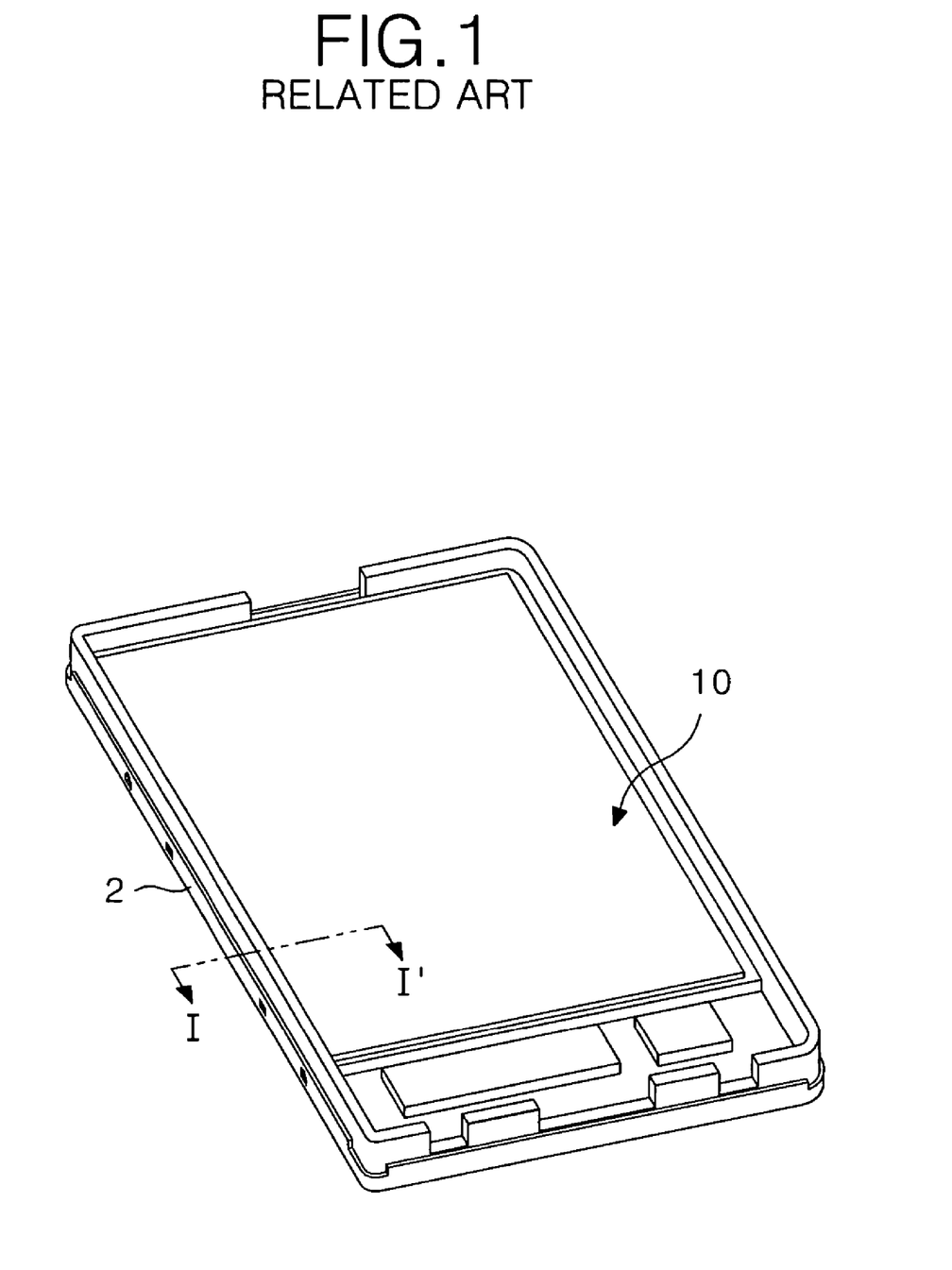
FIG. 1 is a front view illustrating an LCD device after an assembly according to the related art.
Figure 2:
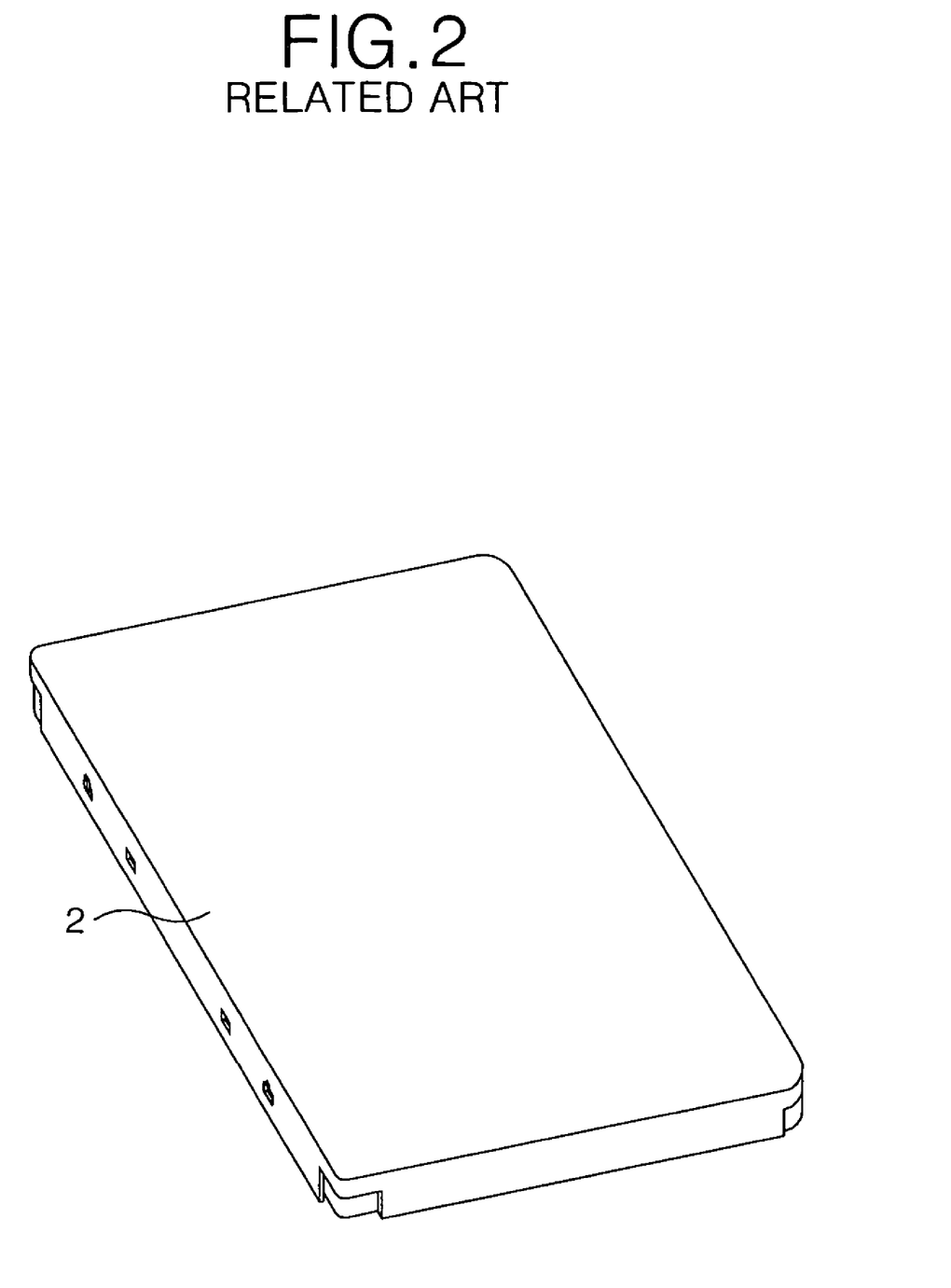
FIG. 2 is a rear view of the LCD device shown in FIG. 1.
Figure 3:
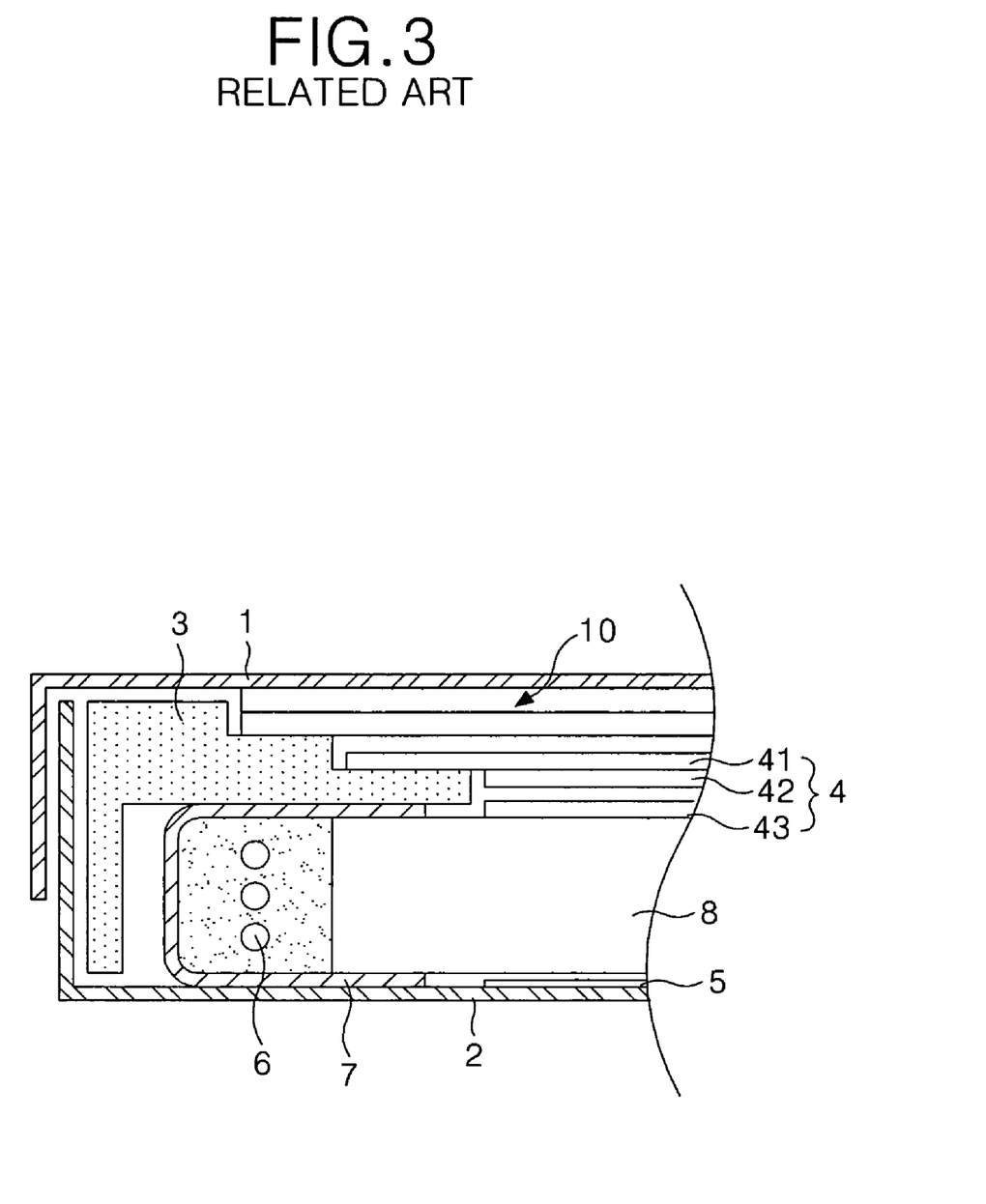
FIG. 3 is a sectional view illustrating the LCD device taken along the line I-I' in FIG. 1.
Figure 4:
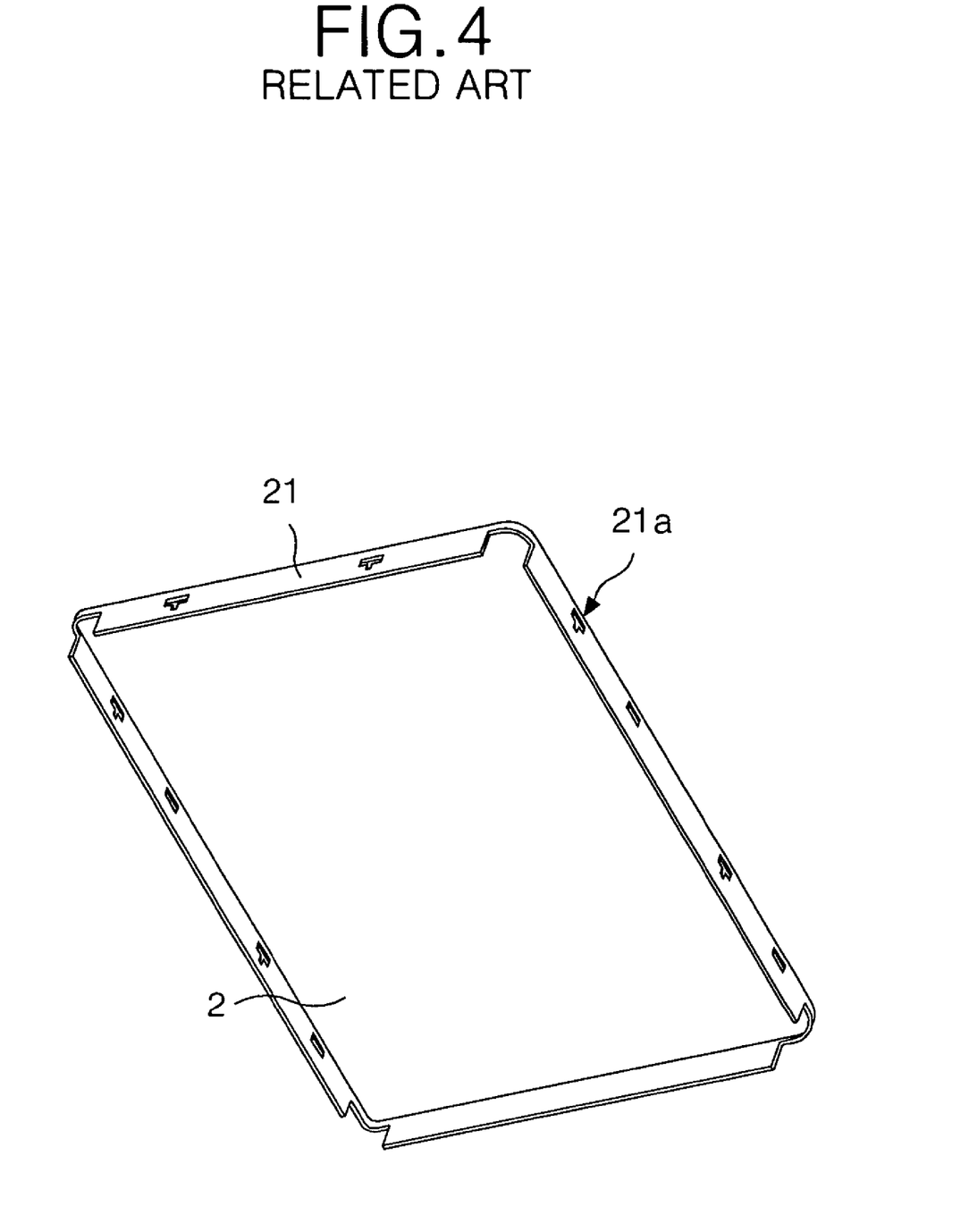
FIG. 4 is a perspective view illustrating a bottom cover of the LCD device shown in FIG. 3.

FIG. 1 is a front view illustrating a related art LCD device after an assembly, FIG. 2 is a rear view of the LCD device of FIG. 1, FIG. 3 is a sectional view illustrating the LCD device taken along the line I-I' in FIG. 1, and FIG. 4 is a perspective view illustrating a bottom cover of the LCD device shown in FIG. 3.

As shown in FIGS. 1 to 4, the related art LCD device includes an LCD panel 10, a top case 1 installed at an upper part of the LCD panel 10, and a backlight unit that is installed at a lower part of the LCD panel 10 to irradiate light to a rear surface of the LCD panel 10. A liquid crystal material is injected between two substrates (not shown) to display a picture, and the top case 1 encases the LCD panel 10 and the backlight unit.

The backlight unit includes a main supporter 3, a bottom cover 2, a lamp 6 that irradiates light to the rear surface of the LCD panel 10, and a light guide plate 8 installed along a side surface of the lamp 6. The main supporter 3 is installed at the lower part of the LCD panel 10 and is formed with a mounting space penetrated from an upper surface to a lower surface in order to mount the LCD panel 10 and the lamp 6 to fix them. Further, the bottom cover 2, which protects the lamp 6 and prevents a leakage of light, is installed at a lower part of the main supporter 3. The main supporter 3 is generally formed of a plastic material. The bottom cover 2 is formed of a metal material, such as aluminum or the like, which has a better heat conductivity than the plastic material. Moreover, a lamp housing 7 is installed to surround the lamp 6.

The light guide plate 8 is installed along the side surface of the lamp 6 to transform light irradiated from the lamp 6 into a surface light to uniformly supply the surface light to the LCD panel 10. A reflection plate 5 is arranged at a lower part of the light guide plate 8 to re-reflect light leaked to an opposition direction of the LCD panel 10. The lamp housing 7 reflects light radiated from the lamp 6 to the light guide plate 8.

An optical sheet 4 includes a diffusion sheet 43, a prism sheet 42 and a protection sheet 41, which are sequentially located at the upper part of the light guide plate 8. Among these sheets, the diffusion sheet 43 diffuses the light from the light guide plate 8 to radiate a uniform light, the prism sheet 42 concentrates the light diffused from the diffusion sheet 43, and the protection sheet 41 protects the prism sheet 42 and diffuses an incident light to radiate a uniform light.

As shown in FIG. 3, the bottom cover 2 is engaged with the main supporter 3. As shown in FIG. 4, the bottom cover 2 is formed in an integration structure, and is formed with four bent parts 21 at each side surface thereof. In each of the bent parts 21, a plurality of engaged holes 21a are formed corresponding to engaging protrusions (not shown) formed in the main supporter 3. The engaging protrusions formed in the main supporter 3 are engaged in the respective engaged holes 21a, thereby securing the main supporter 3 and the bottom cover 2.

However, since the bottom cover 2 is formed in the integration structure, costs for manufacturing the related art LCD device are increased. Moreover, it is time-consuming to develop a mold and to perform management control.

SUMMARY OF THE INVENTION

Accordingly, the present invention is directed to a liquid crystal display (LCD) device and a backlight unit for the LCD device that substantially obviate one or more of problems due to limitations and disadvantages of the related art.

An object of the present invention to provide an LCD device capable of minimizing manufacturing costs by simplifying a structure of a bottom cover and capable of saving time for developing a mold and performing management control.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, an LCD device includes an LCD panel, a backlight disposed under the LCD panel, a main supporter supporting the backlight and the LCD panel, and two bottom covers assembled with the main supporter, wherein the bottom covers are symmetrical to each other to be located at each of both sides of the main supporter.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. In the drawings.

DETAILED DESCRIPTION OF THE PREFERRED EMBODIMENTS

Reference will now be made in detail to the preferred embodiments of the present invention, examples of which are illustrated in the accompanying drawings FIGS. 5 to 9.

Figure 5:
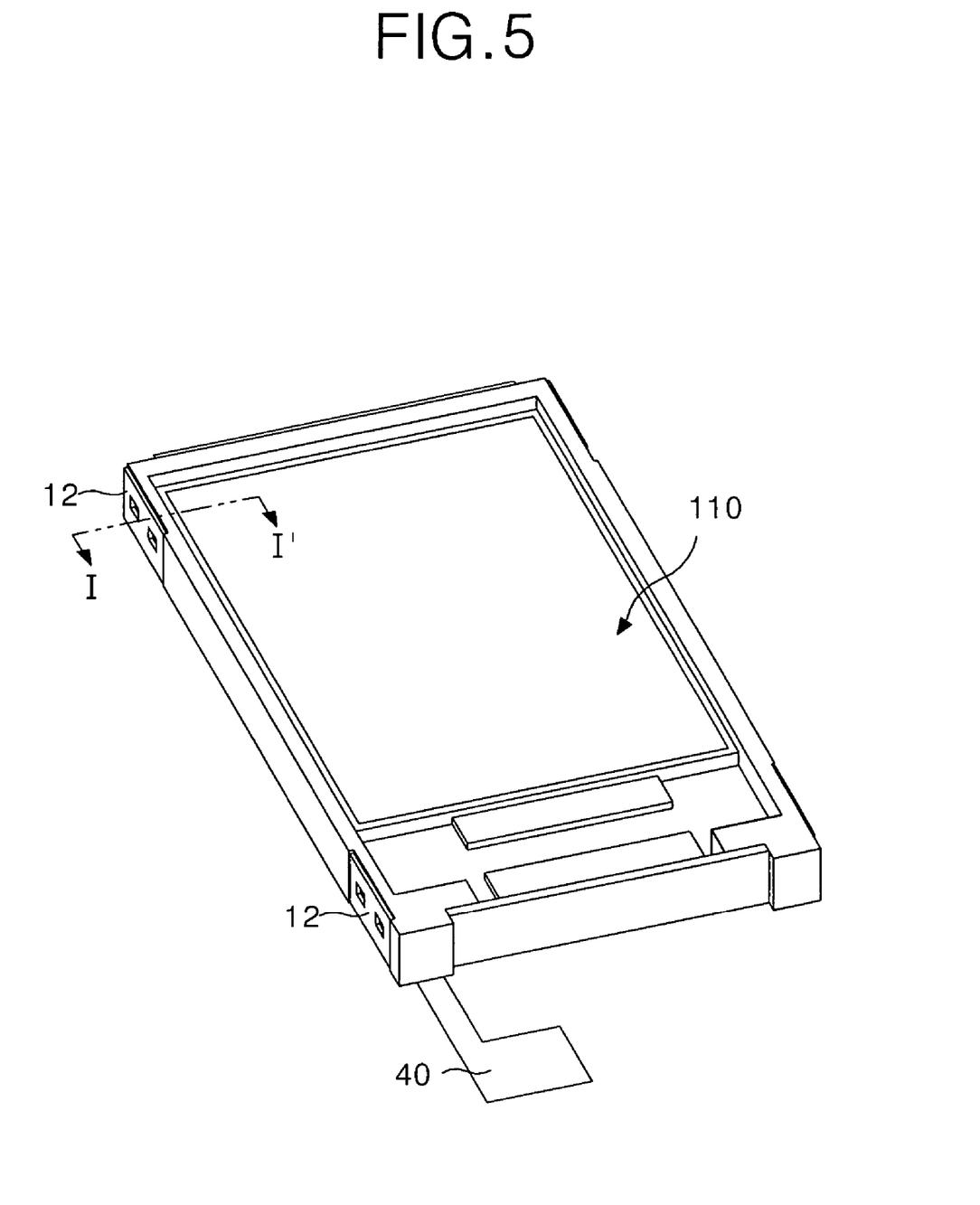
FIG. 5 is a front view illustrating an LCD device after an assembly according to one exemplary embodiment of the present invention.
Figure 6:
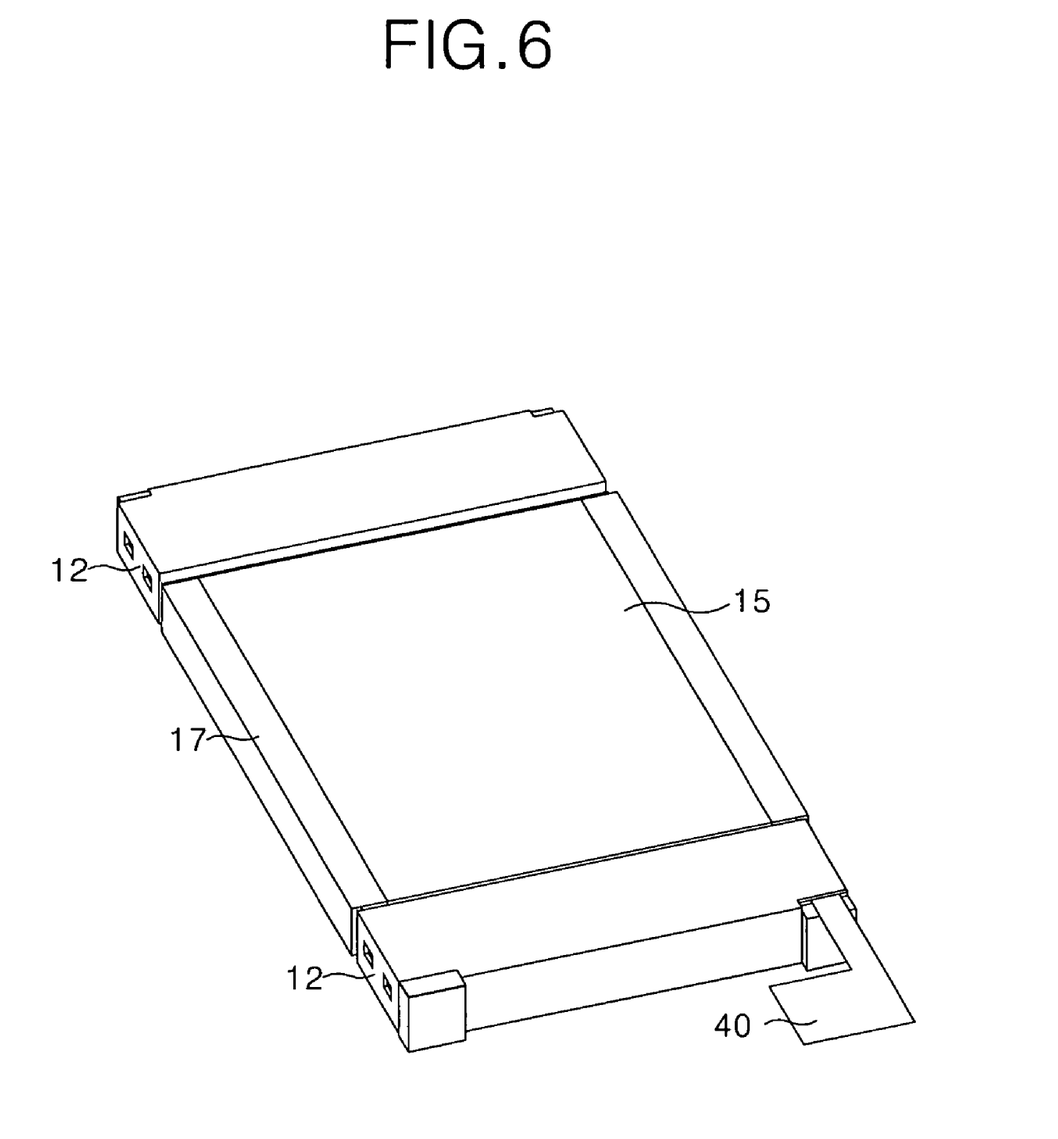
FIG. 6 is a rear view of the LCD device shown in FIG. 5.
Figure 7:
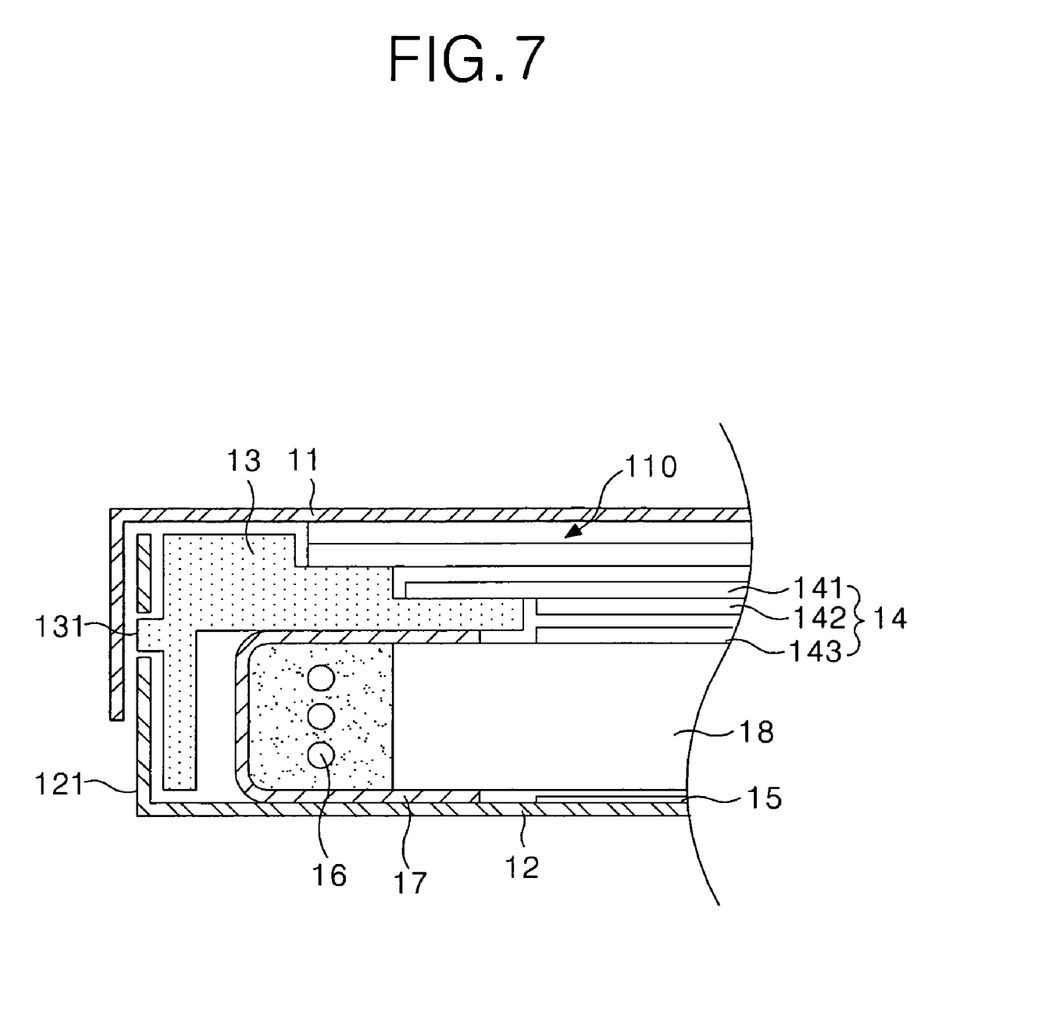
FIG. 7 is a sectional view illustrating the LCD device taken along the line I-I' in FIG. 5.
Figure 8:
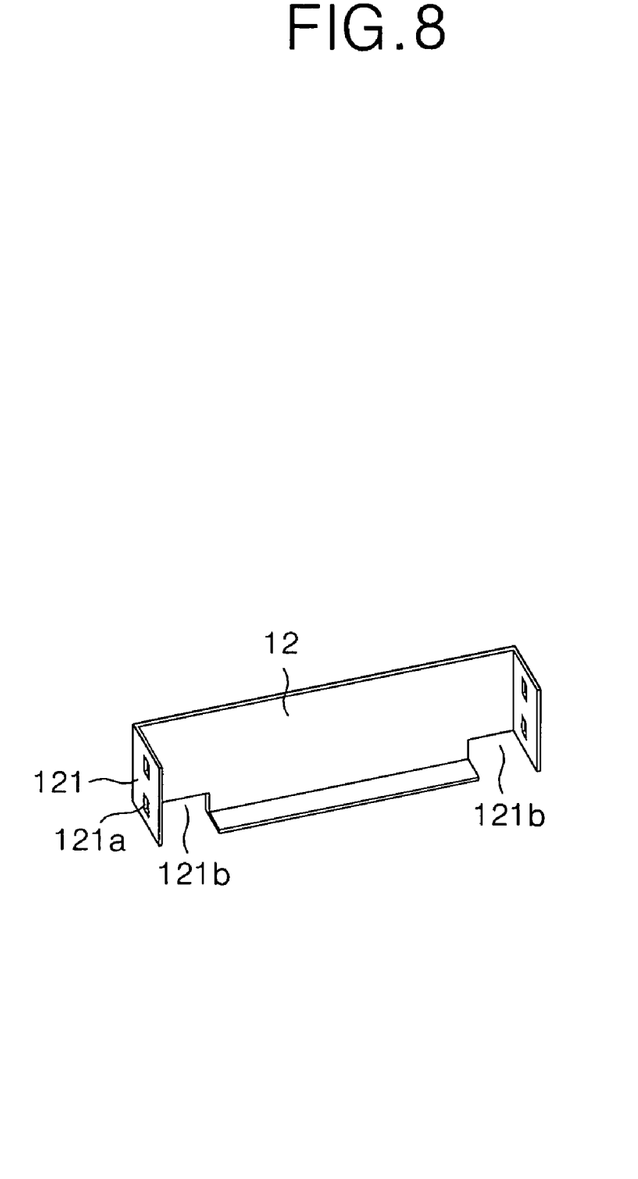
FIG. 8 is a perspective view illustrating a bottom cover of the LCD device shown in FIG. 5.
Figure 9:
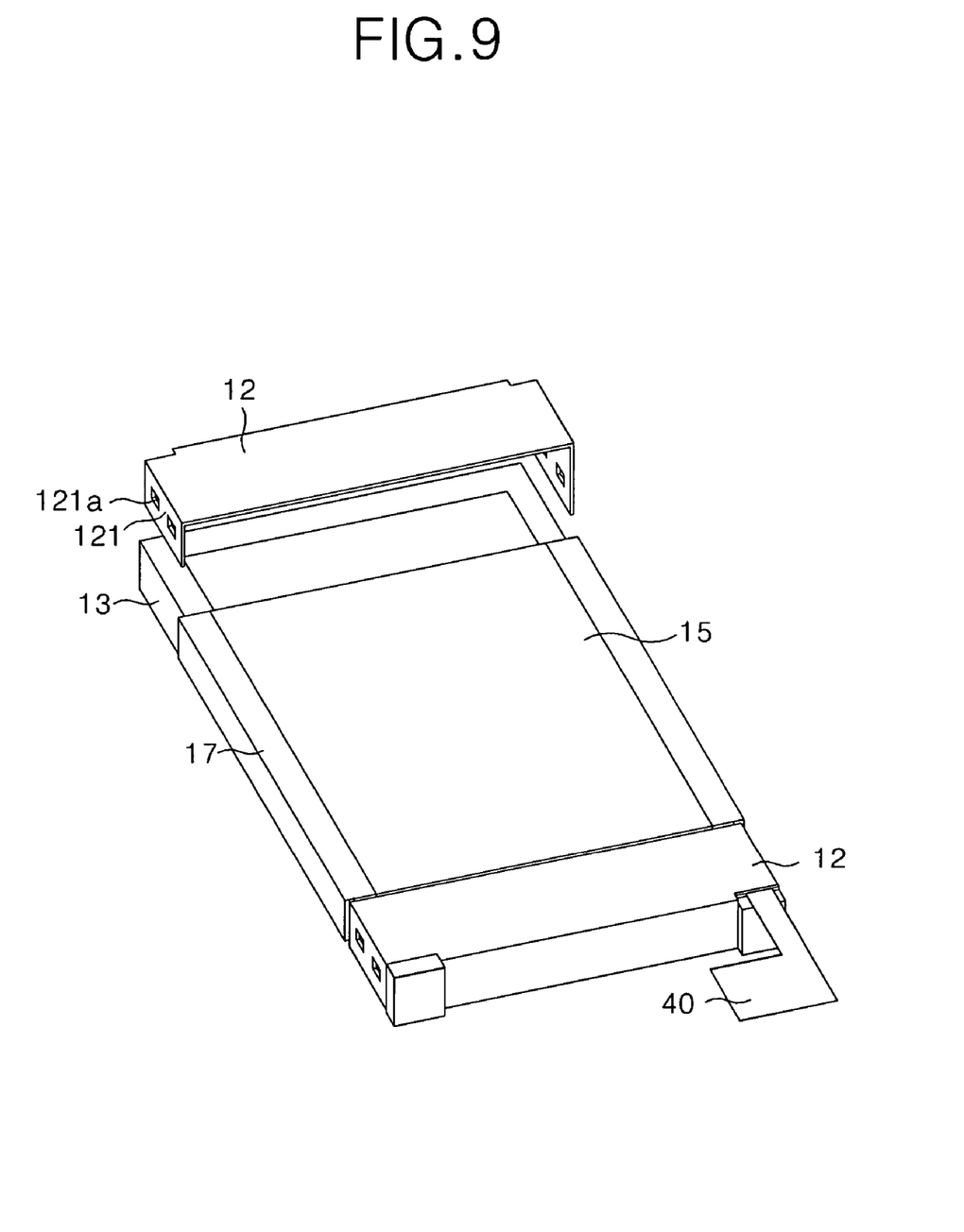
FIG. 9 is a disconnect perspective view for explaining an assembling process of the bottom cover in FIG. 8.

FIG. 5 is a front view illustrating an LCD device after an assembly according to one exemplary embodiment of the present invention, FIG. 6 is a rear view of the LCD device shown in FIG. 5, FIG. 7 is a sectional view illustrating the LCD device taken along the line I-I' in FIG. 5, and FIG. 8 is a perspective view illustrating a bottom cover of the LCD device shown in FIG. 5, and FIG. 9 is a disconnect perspective view for explaining an assembling process of the bottom cover in FIG. 8.

As shown in FIGS. 5 to 9, the LCD device according to the one exemplary embodiment includes an LCD panel 110, a top case 111 installed at an upper part of the LCD panel 110, and a backlight unit that is installed at a lower part of the LCD panel 110 to irradiate light to a rear surface of the LCD panel 110. A liquid crystal material is injected between two substrates to display a picture. The top case 11 encases the LCD panel 110 and the backlight unit.

As shown in FIG. 7, the backlight unit includes a main supporter 13, a bottom cover 12 engaged with the main supporter 13 through a plurality of engaging protrusions 131 (only one is shown in FIG. 7) formed in a side wall of the main supporter 13, a lamp 16 that is located at an upper part of the bottom cover 12 to irradiate light to the rear surface of the LCD panel 110, and a light guide plate 18 installed along a side surface of the lamp 16. The backlight unit further includes a lamp housing 17 for protecting the lamp 16.

The main supporter 13 is formed with a mounting space penetrated from an upper surface to a lower surface to mount the LCD panel 110 and the lamp 16, thereby fixing the LCD panel 10 and the lamp 16. The plurality of engaging protrusions 131 are installed by engaging with a plurality of engaged holes 121a that are formed on a bent part 121. Moreover, after being engaged with the respective engaged holes 121a, the engaging protrusions 131 may each be provided with a stepped part (not shown) in order to prevent from being separated from the engaged hole 121a. In other words, the engaging protrusions 131 may be formed with a taper in a direction installed to the engaged holes 121a, so that the engaging protrusions 131 may have the stepped part in a hook shape to abut against the engaged holes 121a after their engagement.

In this exemplary embodiment, the bottom covers 12 are a division type. As shown in FIG. 9, the bottom covers 12 are divided into two pieces that are symmetrically installed at two sides in a long direction of the main supporter 13. Also, as shown in FIG. 8, the bottom covers 12 each include three surfaces formed with the respective bent parts 121. Two of the three bent parts 121 face each other and are each formed with the plurality of engaged holes 121a. The bent parts 121 are located facing three surfaces of the main supporter 13 upon assembling, so that the engaging protrusions 131 can be inserted into the engaged holes 121.

As shown in FIG. 8, in this exemplary embodiment, one of the bent parts 121 is not formed with the engaged holes 121a, but includes two openings 121b at both sides thereof in the short direction of the main supporter 13. Further, a length of one of the bent parts 121, which is formed in the short direction of the main supporter 13, is designed to be shorter than the length of the main supporter 13 in the short direction. As shown in FIGS. 6 and 9, a flexible printed circuit (FPC) 40 for supplying a driving voltage to the lamp 16 through the opening 121b is inserted to be engaged. The FPC 40 is connected to a metal core printed circuit board MCPCB (not shown). A voltage, supplied to the FPC 40, is applied to the lamp 16 via the MCPCB.

The bottom covers 12 are symmetrical to each other to be engaged with the main supporter 13 symmetrically, so that the bottom covers 12 are molded through one mold. Thus, the bottom covers 12 are made by using the same mold to be symmetrically engaged at both sides of the main supporter 13. Accordingly, it is possible to save time for developing a mold and performing management control and to minimize the material costs because the bottom covers 12 have a smaller size as compared to the integration type bottom cover 2 in the related art. Moreover, the bottom covers may be assembled with the main supporter by using a screw or bolt, etc.

It will be apparent to those skilled in the art that various modifications and variations can be made in the LCD device of the present invention without departing from the spirit or scope of the invention. Thus, it is intended that the present invention cover the modifications and variations of this invention provided they come within the scope of the appended claims and their equivalents.

What is claimed is:

1. A liquid crystal display (LCD) device, comprising:
   an LCD panel;
   a top case disposed on the LCD panel;
   a main supporter supporting the LCD panel;
   two bottom covers assembled with the main supporter, wherein the bottom covers are symmetrically installed at two sides of a rear surface of the main supporter, wherein the two bottom covers each include first to third bent parts formed at three sides thereof so as to cover three surfaces of the main supporter, and wherein the first and second bent parts opposite to each other each have a plurality of engaged holes and the third bent part has no engaged hole and each bottom cover has two openings formed between the first and third bent parts and between the second and third bent part;
   a lamp disposed between the two bottom covers and on one side of the LCD panel;
   a lamp housing encompassing the lamp for protecting the lamp;
   a light guide plate installed at a side surface of the lamp; and
   a flexible printed circuit (FPC) to supply a voltage to the backlight unit, the FPC being connected to the lamp through one of the two openings, wherein the main supporter includes a plurality of engaging protrusions inserted into the engaged holes;

wherein the two bottom covers support the lamp, the lamp housing and the light guide plate, wherein the main supporter is protruded from the two openings of each bottom cover, and wherein the first to third bent parts are identical to the side of the main supporter in height.

2. The LCD device according to claim 1, wherein each protrusion includes a stepped part so that each engaging protrusion is able to abut against each engaged hole after being inserted thereinto.

3. The LCD device according to claim 1, wherein the bottom covers are assembled with the main supporter by using a screw or a bolt.

* * * * *